Figure 1:
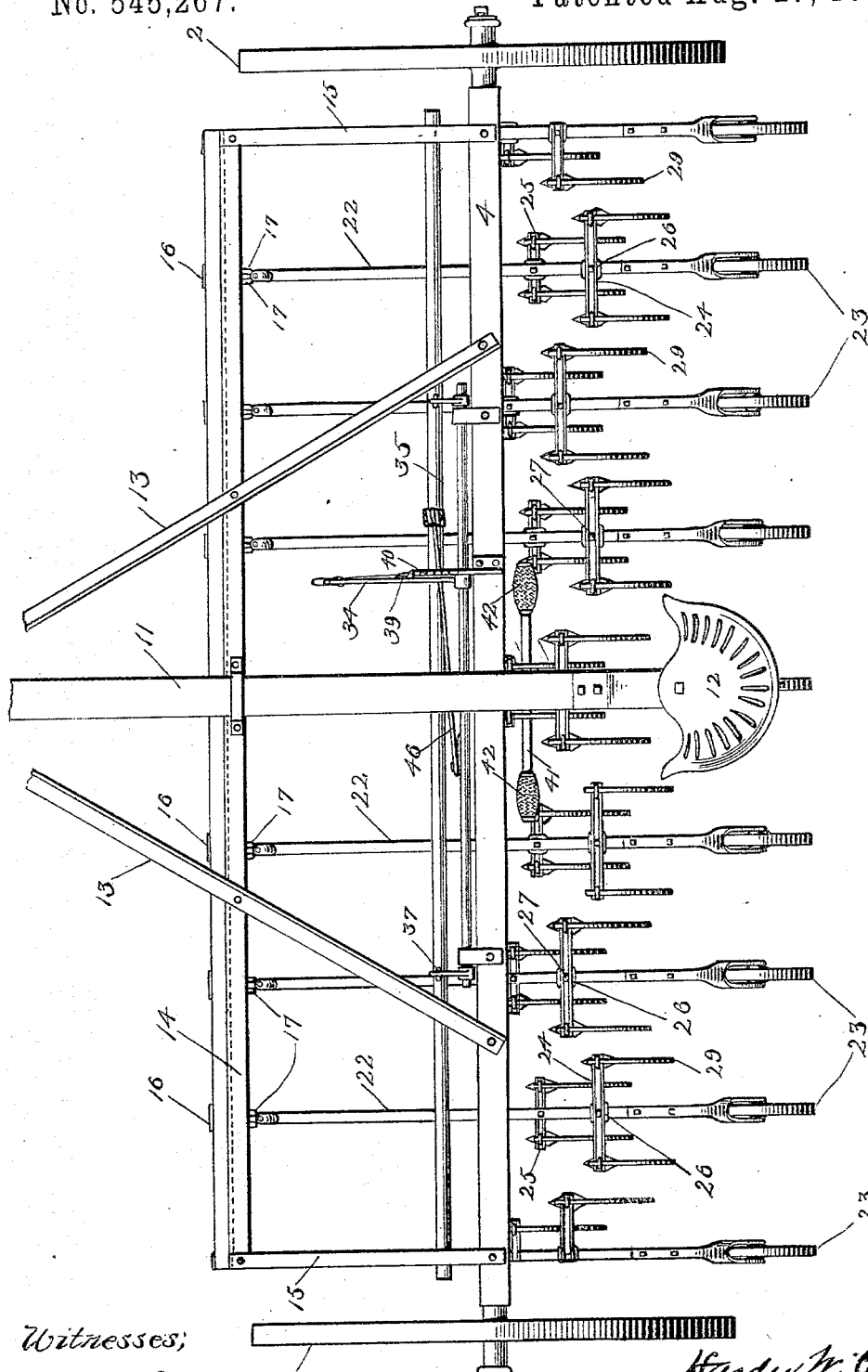

(No Model.) 4 Sheets—Sheet 1.
H. W. CAMPBELL.
CULTIVATOR.

No. 545,267. Patented Aug. 27, 1895.

Witnesses:
Henry B. Avery
Frederick S. Lyon

Hardy W. Campbell
by Paul O. Hawley
his atty

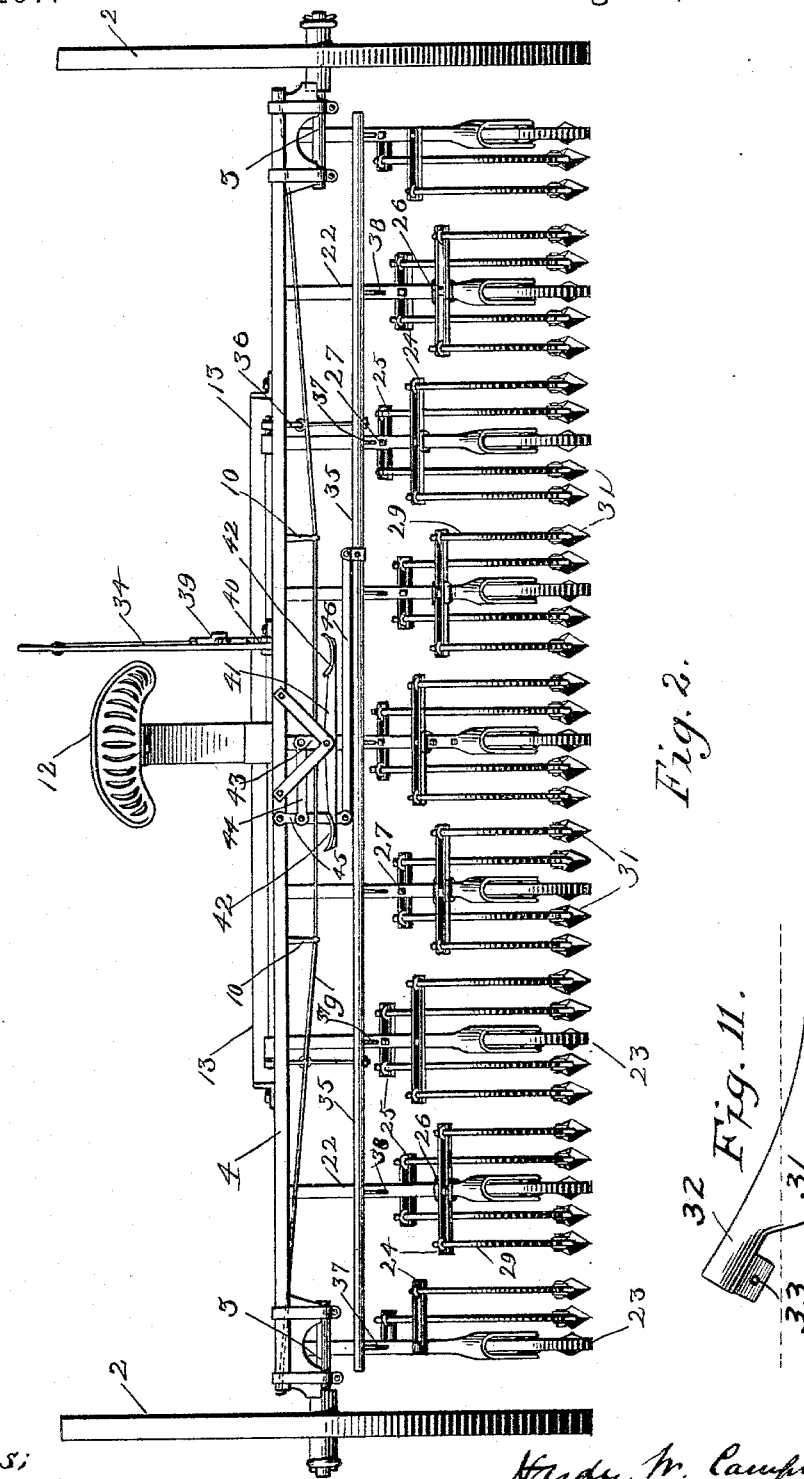

(No Model.) 4 Sheets—Sheet 3.
H. W. CAMPBELL.
CULTIVATOR.
No. 545,267. Patented Aug. 27, 1895.
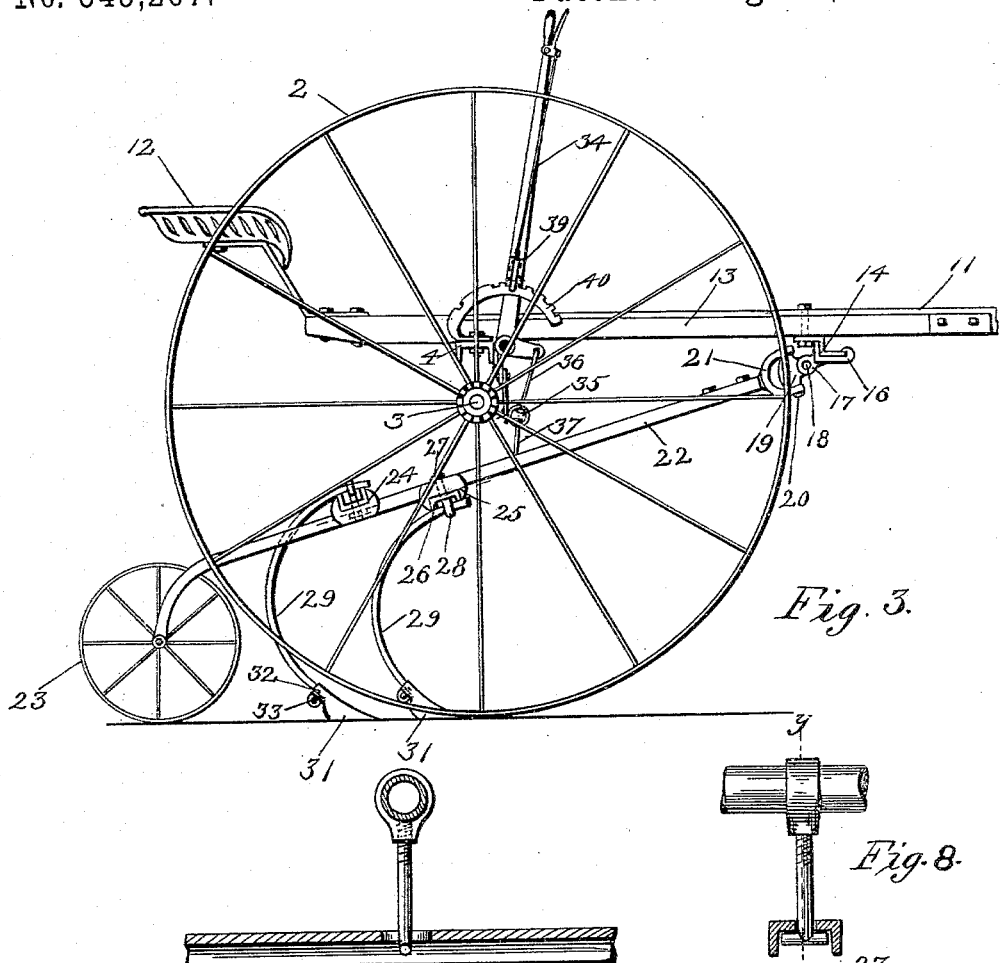
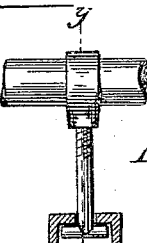
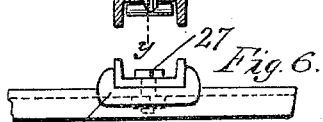
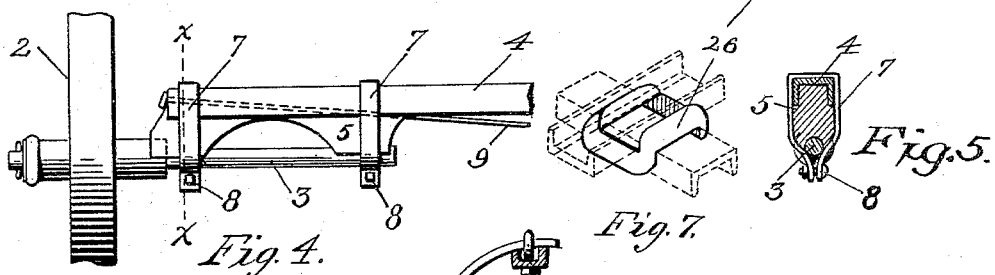
Witnesses:
Henry B. Avery
Frederick S. Lyon
Hardy W. Campbell
by Paul & Hawley
his attys (No Model.) 4 Sheets—Sheet 4.

H. W. CAMPBELL.
CULTIVATOR.

No. 545,267. Patented Aug. 27, 1895.

Witnesses:
Chas. E. Van Dorn.
Richard Paul,

Inventor:
Hardy W. Campbell.
By Paul & Hawley
his Attorneys.

UNITED STATES PATENT OFFICE.

HARDY W. CAMPBELL, OF PUTNEY, SOUTH DAKOTA.

CULTIVATOR.

SPECIFICATION forming part of Letters Patent No. 545,267, dated August 27, 1895.

Application filed September 4, 1894. Serial No. 522,021. (No model.)

*To all whom it may concern:*

Be it known that I, HARDY W. CAMPBELL, of Putney, Brown county, State of South Dakota, have invented certain new and useful Improvements in Cultivators, of which the following is a specification.

My invention relates to cultivators; and the object of my invention is to provide a cultivator having a number of small teeth adapted to enter the ground an inch, more or less, for the purpose of breaking or loosening the surface, to the end that the little connecting cells or pores may be broken and separated, and thereby cut off the natural course of the moisture from the seed-bed to the surface, and thus prevent the evaporation of the moisture contained therein.

Heretofore much trouble has been experienced in dry arid countries from the fact that after the soil has been put in proper condition to absorb and retain the moisture in the root and seed bed by thoroughly pulverizing and packing it to the bottom of the plowing the seeding is usually followed by showers, which invariably settles the loamy soil on the surface of the prairie down to a solid mass. This surface must be immediately broken and loosened to the depth of about one inch, or all the moisture stored up for crop growth will pass off up through the little fine pores of the newly-packed surface. The surface can be loosened and broken most effectually by a cultivator having chisel or sharp edged teeth arranged to pass over the soil nearly flatwise a short distance beneath the surface, thereby separating and mixing about one inch of earth on the surface, which naturally breaks apart as it falls back over the cultivator-teeth. The earth on the surface that is loosened by this operation will soon dry, and as the pores are separated and broken the earth thus thrown up will form a perfect mulch and prevent further evaporation from that part of the earth below the loosened surface. To avoid the difficulty above outlined, I have devised a cultivator adapted for surface cultivation of small grain in close drills and almost any distance apart, and also adapted for cultivating two or more rows of potatoes or corn. After years of experimenting it has been found that frequent shallow cultivation will cause the earth to retain moisture during dry seasons, and to get the best possible results the ground must be gone over as quickly as possible after a heavy rain, as evaporation will commence immediately after the rainfall, and it is also very desirable to destroy weeds when young and tender.

My invention consists generally in a cultivator having a large number of closely-arranged small cultivator teeth or plows an inch or more in width and generally of less height, the same being adapted to thoroughly stir and pulverize the surface of the ground, though entering the same but a short distance, not so far as to necessitate the employment of a large power to draw the machine or so far as to draw or break the deeper ground, which should be left in the condition in which it is usually found after plowing and rolling— namely, being thoroughly pulverized and pressed to the bottom of the plowing.

My invention consists, further, in details of construction and in combinations, as hereinafter described, and particularly pointed out in the claims.

The invention will be more readily understood by reference to the accompanying drawings, wherein—

Figure 12:
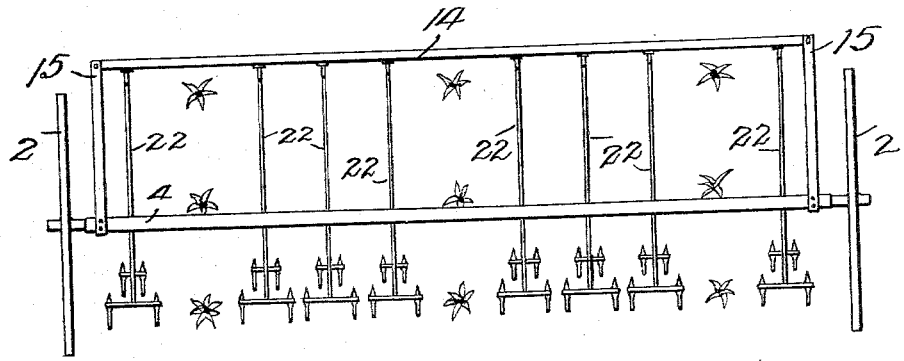
Figure 14:
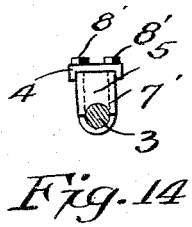
Figure 13:
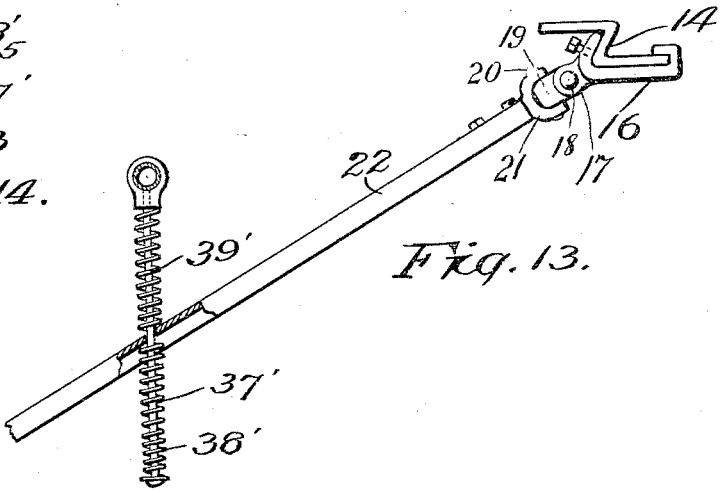

Figure 1 is a plan view of a cultivator embodying my invention. Fig. 2 is a rear view thereof. Fig. 3 is an end view of the same, enlarged. Fig. 4 is a detail showing the manner of attaching the short axles of the wheels to the main axle of the machine. Fig. 5 is a sectional view thereof on the line $x$ $x$ of Fig. 4. Fig. 6 is a detail showing the manner of securing the transverse bars or irons upon the longitudinal carrying-bars. Fig. 7 is a perspective view with the bars shown in dotted lines and the locking-iron shown in full lines. Fig. 8 is a detail showing the attachment between the transverse rod and the carrying-bars. Fig. 9 is a sectional view thereof on the line $y$ $y$ of Fig. 8. Fig. 10 is a detail showing the manner of attaching the curved teeth to the transverse bars or sections. Fig. 11 is an enlarged detail view of one of the small plows or teeth. Fig. 12 is a partial plan view of the machine, showing the arrangement of the adjustable sets of cultivator-teeth when it is desired to cultivate corn or potatoes. Fig. 13 is a detail of the carrying-bar, showing the manner in which it is secured to the Z-bar, and also showing the spiral springs arranged on the supporting-links above and below the carrying-bars. Fig. 14 is a modification of the method of securing the short axles of the wheels to the main axle of the machine, as shown in Fig. 5.

In the drawings I have shown a large gang-cultivator provided with nine sets of cultivator-plows, the several sets being independently movable.

2 represents the large wheels of the machine, which are arranged on the short axles 3, fastened to the long channel-iron 4, which serves as the main axle of the machine.

The detail of the fastening is shown in Figs. 4 and 5, wherein 5 represents a block extending up into the channel of the axle 4 and resting upon the short axle at the bottom, the block preferably having bearings upon opposite ends of the short axles. The parts are secured together by the straps 7, drawn tightly to place by means of bolts 8, as shown in Fig. 5, or a U-shaped iron 7' may be used, having its ends extending up through the channel-iron 4 and secured by the nuts 8', as shown in Fig. 14. A truss-rod 9 preferably extends from the ends of the main channel iron or axle and beneath the same, bridging across depending studs 10, secured on the axle 4.

The machine is intended to be drawn by two or more horses and is provided with a long pole 11, preferably extending some distance back of the main axle 4 to receive the driver's seat 12. The pole is braced by suitable braces 13, secured upon a forward part thereof and at points near the outer ends of the main axle 4. These braces and the tongue or pole are adapted to support the strong transverse draft-bar 14, which is preferably in the form of a Z-iron, as shown clearly in Fig. 3. The upper rear flange of the iron is firmly bolted and secured to the braces 13 and to the pole 11, and also steadied at the ends by the horizontal stay-bars 15. (See Fig. 1.)

The draft-bar 14 is of nearly the same length as the axle 4, and upon the draft-bar at substantially equal distances from one another I arrange the cast-iron clips 16, having hooks at their forward end to embrace the lower edge of the Z-iron. The clips 16 are adjustable and are further secured to the Z-iron by a set-screw, as shown in Fig. 13. When it is desired to cultivate corn or potatoes, the clips may be moved along the Z-bar, so that three sections of the cultivator-teeth will be arranged together between each row, and one set of teeth will be in the same row with the wheels of the machine and will cultivate one-half of the row, or a part thereof, as shown in Fig. 12. Each clip is provided on its rear side or corner with two lugs 17 to receive a bolt 18, whereon the knuckle 19 of the universal joint is pivoted. The other portion of the knuckle is at right angles to the first part and is itself pivoted on a bolt 20, having its ends secured in the yoke 21. By this means the carrying-bar 22 is universally pivoted upon the draft-bar to permit movement of the carrying-bar in any desired direction. The arrangement is the same for each carrying-bar, as indicated in Fig. 1. The carrying-bars are preferably made of channel-steel, and the forward ends embrace the shanks of the yokes 21 to be secured thereon. These bars 22 extend back and incline slightly downward and their rear ends are supported upon small wheels 23. These wheels are detachable and are intended to be used only on rolling and uneven ground. On the level prairie the cultivator-teeth may be regulated entirely by the springs hereinafter described.

At intermediate points on each carrying-bar 22 I arrange the two transverse bars 24 and 25, both being preferably slightly back of the axle 4. These transverse bars are adapted to support the teeth or plows of the set and to fasten them rigidly upon the bar 22 I provide the right-angled channel-blocks or locking-irons 26, (shown in detail in Figs. 6 and 7,) the channels in the bottom and top thereof being at right angles to one another and sufficiently deep to receive the channel-iron or bar 22 and the cross-bar 24 or 25, respectively. The iron prevents the cross-bar from swinging on the bar 22, and sliding is prevented by the bolts 27, which extend through the two bars, as shown in Fig. 6. These bolts are preferably eyebolts, the eyes 28 thereof being adapted to receive the upper end of the curved and preferably spring-teeth 29, which, when the bolts are drawn to place by means of their nuts, are locked against the flanges of the cross-bars and thus prevented from turning thereon. These spring-teeth may be of any desired form and are preferably provided, as shown in Fig. 10, with sharp lower ends 30, so that the teeth themselves may be employed for stirring the ground.

When it is desired to use the machine for general cultivation or for fitting fields for crops more sections of teeth may be used, thereby making a machine similar to a riding-harrow. The spring-teeth are ordinarily used, however, with small plows or detachable teeth 31 of from one to three inches in width and adapted to enter the ground an inch or more. The plows 31 are preferably made from sheet metal, being bent into the desired form and provided with split-collar ends 32 so shaped that the plows may be secured on the lower end of the spring-teeth 30 by simply tightening the short bolts 33. The front transverse bar 25 is shorter than the rear one and is adapted to carry two teeth, while the rear bar is arranged to carry three. It is obvious that the number of teeth may be increased or decreased at pleasure so long as the teeth of a set are so arranged that their paths will intermesh. The several sets of plows or teeth are arranged forward and back from one another, so that while the teeth are throughout of substantially the same distance apart no two of the same will travel opposite one another, in which case they might become clogged. The wheels 23 are preferably arranged on yokes which are separate from the bars 22 and are pivoted thereon in such a manner that the wheels may be adjusted to raise or lower the cultivator teeth, or they may be detached entirely from the carrying-bars. For raising all of the teeth from the ground I employ a lever 34, pivoted on the axle 4 and connected with the several bars 22 by a long transverse rod or pipe 35 and links 36 and 37. A link 37 extends into the pipe from each bar 22. The links 37 are preferably T-headed bolts, the bolts being passed up through slots 38 in the bars 22 and secured in the overlying pipe or rod 35 in any suitable manner, preferably by being screwed into a boss provided on each of a series of collars arranged on the rod 35. The bolt 37 extends through the boss on the collar and striking the rod 35 serves to hold the collar firmly in position. A lock 39 and toothed quadrant 40 are provided to lock the lever and hold the parts in any desired position.

For moving the cultivator-teeth from side to side in order to avoid striking into the rows of grain, I provide means for swinging the rod or pipe 35 and therewith the several bars 22 with the several sets of cultivator-teeth. Such means consist in a centrally-pivoted rod or double lever 41, having steps or rests 42 at opposite ends for the feet of the driver. The double lever is provided with a crank-arm 43, from which a link 44 extends to a short lever 45 having its upper end pivoted on the axle. The lower end of the short lever is connected with the rod 35 by a long link 46. As the double lever is depressed on either side, the rod 35 and the several sets of teeth will be obviously moved a short distance in a lateral direction.

To cope with the difficulties resulting from the various conditions of the soil which affect the depth to which the teeth or plows will run into the ground, I have provided a bolt 37', extending below the carrying-bars 22 and having the coiled springs 38' and 39' arranged on the bolt 37', as shown in Fig. 13. When it is desired to make use of this device, the wheel 23 is removed. The carrying-bars 22 will then be supported by the bolts 37' and by the coiled springs 38', arranged thereon. When the ground is hard or in case the grass or weeds have grown so as to tend to throw the teeth of the cultivator out of the ground, the lever 34 is thrown forward and the spring 39' compressed and the carrying-bar 22 forced down, driving the teeth of the cultivator into the ground. If the cultivator is passing over soft ground, the lever 34 may be thrown back, raising the carrying-bars 22 so that the cultivator-teeth and the carrying-bars will be supported upon the spring 38'.

It is obvious that the cultivator which I have shown and described herein admits of many modifications in its construction, all of which might be made without departing from the spirit of my invention, and I therefore do not confine myself to the specific construction detailed.

Having thus described my invention, I claim as new and desire to secure by Letters Patent—

1. In a cultivator, the combination, with a suitable carriage, of a series of carrying bars pivotally connected at their forward ends to said carriage, a spring connected to each bar and forming a support for the rear end thereof, a series of teeth supported upon said bar, means for adjusting said teeth, and a raising device for raising said bars and teeth, substantially as described.

2. In a cultivator, the combination with a suitable carriage, of a series of carrying bars pivotally connected at their forward ends to said carriage, groups of teeth secured upon each of said bars, means for raising and lowering said bars and teeth, and means under the control of the operator for simultaneously moving all of said teeth laterally in either direction.

3. In a cultivator, the combination with a suitable carriage, of a series of carrying bars connected at their forward ends to laterally movable slides, groups of teeth secured upon each carrying bar, the teeth upon adjacent bars not being opposite to each other, and means for supporting the rear ends of said carrying bars.

4. In a cultivator, the combination, with a suitable carriage, of a series of carrying bars, laterally adjustable slides to which the forward ends of said carrying bars are pivoted, means for supporting the rear ends of said carrying bars, groups of teeth secured upon said carrying bars, and means for vertically and laterally adjusting said carrying bars and said teeth.

5. In a cultivator, the combination, with a suitable carriage of a series of carrying bars pivotally supported at their forward end upon said carriage, groups of teeth carried by each of said bars, means for supporting the rear ends of said carrying bars, a bar or rod extending transversely of the machine, means under the control of the operator for moving said bar across the machine in either direction, and connections between said bar and each of said carrying bars.

6. In a cultivator, the combination, with a suitable carriage, of a series of longitudinal draft or carrying bars pivotally connected at their forward ends to the carriage and each provided at its rear end with a series of teeth, a raising and lowering lever and spring connections between said lever and said carrying bars, for the purpose set forth.

7. The combination, in a cultivator, with the carriage, of the longitudinal draft rods or carrying bars, the transverse bars arranged on said carrying bars, the curved spring teeth removably secured on said transverse bars, means for supporting the rear ends of said carrying bars, and for adjusting the height of said teeth, substantially as described.

8. In a cultivator, the combination, with the carriage, of the series of carrying bars pivotally connected at their forward ends to said carriage, groups of teeth carried by each bar, a transverse rod upon said carriage, connections between said rod and said bars, means for raising said rod, and means for moving said rod transversely of the carriage.

9. In a cultivator, the combination, with the transverse draft bar 14, of the series of clips 16, the series of carrying bars connected to said clips by universal couplings, means for supporting the rear ends of said bars, groups of teeth carried by said bars, means for raising and lowering said bars and said teeth and means for laterally adjusting said bars and teeth.

In testimony whereof I have hereunto set my hand this 9th day of July, A. D. 1894.

HARDY W. CAMPBELL.

Witnesses:
F. E. CAMPBELL,
CLINTON SMITH.